(12) United States Patent
Slivkoff (10) Patent No.: US 6,721,799 B1
(45) Date of Patent: Apr. 13, 2004

(54) METHOD FOR AUTOMATICALLY TRANSMITTING AN ACKNOWLEDGE FRAME IN CANOPEN AND OTHER CAN APPLICATION LAYER PROTOCOLS AND A CAN MICROCONTROLLER THAT IMPLEMENTS THIS METHOD

(75) Inventor: William J. Slivkoff, San Jose, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/474,904

(22) Filed: Dec. 30, 1999

Related U.S. Application Data (60) Provisional application No. 60/154,022, filed on Sep. 15, 1999.

(51) Int. Cl.⁷ .............................................. G06F 15/16
(52) U.S. Cl. ..................... 709/236; 700/101; 700/19; 700/21; 710/121; 710/157
(58) Field of Search ............................... 700/1, 19, 20, 700/23, 24, 55; 709/236

(56) References Cited

U.S. PATENT DOCUMENTS

| | | | | |
|---|---|---|---|---|
| 5,323,385 A | * | 6/1994 | Jurewicz et al. | 370/43 |
| 5,502,818 A | * | 3/1996 | Lamberg | 395/200.16 |
| 5,574,848 A | * | 11/1996 | Thomson | 395/181 |
| 5,675,830 A | * | 10/1997 | Satula | 395/82.9 |
| 5,854,454 A | * | 12/1998 | Upender et al. | 187/247 |
| 6,122,713 A | * | 9/2000 | Huang et al. | 711/147 |
| 6,252,851 B1 | * | 6/2001 | Siu et al. | |
| 6,363,083 B1 | * | 3/2002 | Spielbauer et al. | 370/470 |

OTHER PUBLICATIONS

Siemens Microelectronics, Inc: "Control area Network" Internet, 'Online! 1998, XP002156911 Retrieved from the Internet p. 56 or p. 58.

Philips "XA–C3 Microcontroller" Internet, 'Online! Jan. 25, 2000, XP002156912 Retrieved from the Internet. The whole document.

* cited by examiner

Primary Examiner—Rupal Dharia
Assistant Examiner—Adnan Mirza
(74) Attorney, Agent, or Firm—Aaron Waxler (57) ABSTRACT

A method for use in a CAN device (e.g., a CAN microcontroller) that includes a processor core, for automatically transmitting an acknowledge message. The method includes the steps of receiving a frame of a multi-frame fragmented message, and automatically transmitting an acknowledgment message without requiring any intervention of the processor core, in response to the receiving step. The automatically transmitting step is preferably performed by hardware external to the processor core, e.g., a CAN/CAL module of the CAN device. In a preferred embodiment, the method includes the steps of setting up a first message object having an object number n as a receive message object, enabling the receive message object, setting up a second message object having an object number n+1 as a transmit message object corresponding to the receive message object, storing the acknowledgment message in a response message buffer associated with the transmit message object, receiving a frame of a multi-frame fragmented message, acceptance filtering the received frame to determine that the received frame matches the enabled receive message object, enabling the transmit message object, and automatically transmitting the acknowledgment message, without requiring any intervention of the processor core.

26 Claims, 7 Drawing Sheets

MMRs

| MMR name | R/W? | Reset | Access | Address Offset | Description |
|---|---|---|---|---|---|
| Message Object Registers (n = 0 - 31) | | | | | |
| MnMIDH | R/W | x....x00b | Word only | 000$n_4n_3n_2n_1n_0$0000b (n0h) | Message n Match ID High |
| MnMIDL | R/W | xxxxh | Word only | 000$n_4n_3n_2n_1n_0$0010b (n2h) | Message n Match ID Low |
| MnMSKH | R/W | x....x000b | Word only | 000$n_4n_3n_2n_1n_0$0100b (n4h) | Message n Mask High |
| MnMSKL | R/W | xxxxh | Word only | 000$n_4n_3n_2n_1n_0$0110b (n6h) | Message n Mask Low |
| MnCTL | R/W | 00000xxxb | Byte/Word | 000$n_4n_3n_2n_1n_0$1000b (n8h) | Message n Control |
| MnBLR | R/W | xxxxh | Word only | 000$n_4n_3n_2n_1n_0$1010b (nAh) | Message n Buffer Location |
| MnBSZ | R/W | 00000xxxb | Byte/Word | 000$n_4n_3n_2n_1n_0$1100b (nCh) | Message n Buffer Size |
| MnFCR | R/W | 00xxxxxxb | Byte/Word | 000$n_4n_3n_2n_1n_0$1110b (nEh) | Message n Fragmentation Count |
| CIC Registers | | | | | |
| MCPLL | R/C | 0000h | Byte/Word | 224h | Message Complete Low |
| MCPLH | R/C | 0000h | Byte/Word | 226h | Message Complete High |
| CANINTFLG | R/C | 0000h | Byte/Word | 228h | CAN Interrupt Flag Register |
| MCIR | RO | 0000h | Byte/Word | 229h | Message Complete Info Reg. |
| MEIR | RO | 0000h | Byte/Word | 22Ah | Message Error Info Register |
| FESTR | R/C | 0000h | Byte/Word | 22Ch | Frame Error Status Register |
| FEENR | R/W | 0000h | Byte/Word | 22Eh | Frame Error Enable Register |
| SCP/SPI Registers | | | | | |
| SPICFG | R/W | 0000h | Byte/Word | 260h | SCP/SPI Configuration |
| SPIDATA | R/W | 00h | Byte/Word | 262h | SCP/SPI Data |
| SPICS | R/W | 00h | Byte/Word | 263h | SCP/SPI Control and Status |
| CCB Registers | | | | | |
| CANCMR | R/W | 01h | Byte/Word | 270h | CAN Command Register |
| CANSTR | R/O | 00h | Byte/Word | 271h | CAN Status Register |
| CANBTR | R/W | 00h | Byte/Word | 272h | CAN Bus Timing Reg. (low) |
| - | R/W | 00h | Byte/Word | 273h | CAN Bus Timing Reg. (high) |
| TXERC | R/W* | 00h | Byte/Word | 274h | Tx Error Counter |
| RXERC | R/W* | 00h | Byte/Word | 275h | Rx Error Counter |
| EWLR | R/W | 96h | Byte/Word | 276h | Error Warning Limit Register |
| ECCR | RO | 0000h | Byte/Word | 278h | Error Code Capture Register |
| ALCR | RO | 0000h | Byte/Word | 27Ah | Arbitration Lost Capture Reg. |
| RTXDTM | WO | 0000h | Byte/Word | 27Ch | RTX Data Test Mode |
| GCTL | R/W | 0000h | Byte/Word | 27Eh | Global Control Byte |
| MIF Registers | | | | | |
| XRAMB | R/W | FEh | Byte/Word | 290h | XRAM Base Address |
| MBXSR | R/W | FFh | Byte/Word | 291h | Msg. Buff./XRAM Seg. Reg. |
| MIFBTRL | R/W | EFh | Byte/Word | 292h | MIF Bus Timing Reg. Low |
| MIFBTRH | R/W | FFh | Byte/Word | 293h | MIF Bus Timing Reg. High |

Legend: R/W = Read & Write, RO = Read Only, WO = Write Only, R/C = Read & Clear, W* = Writable only during CAN Reset mode, x = undefined after reset.

Object n Match ID Field (MnMIDH and MnMIDL)

| Mid28 – Mid18 | Mid17 – Mid10 | Mid9 – Mid2 | Mid1 | Mid0 | MIDE |
|---|---|---|---|---|---|

Object n Mask Field (MnMSKH and MnMSKL)

| Msk28 – Msk18 | Msk17 – Msk10 | Msk9 – Msk2 | Msk1 | Msk0 |
|---|---|---|---|---|

Screener ID Field (assembled from incoming bit-stream)

| CAN ID.28 – CAN ID.18 | Data Byte 1 [7:0] | Data Byte 2 [7:0] | x | x | IDE |
|---|---|---|---|---|---|

FIG. 9

Object n Match ID Field (MnMIDH and MnMIDL)

| Mid28 – Mid18 | Mid17 – Mid10 | Mid9 – Mid2 | Mid1 | Mid0 | MIDE |
|---|---|---|---|---|---|

Object n Mask Field (MnMSKH and MnMSKL)

| Msk28 – Msk18 | Msk17 – Msk10 | Msk9 – Msk2 | Msk1 | Msk0 |
|---|---|---|---|---|

Screener ID Field (assembled from incoming bit-stream)

| CAN ID.28 – CAN ID.0 | IDE |
|---|---|

METHOD FOR AUTOMATICALLY TRANSMITTING AN ACKNOWLEDGE FRAME IN CANOPEN AND OTHER CAN APPLICATION LAYER PROTOCOLS AND A CAN MICROCONTROLLER THAT IMPLEMENTS THIS METHOD

This application claims the full benefit and priority of U.S. Provisional Application Ser. No. 60/154,022, filed on Sep. 15, 1999, the disclosure of which is fully incorporated herein for all purposes.

BACKGROUND OF THE INVENTION

The present invention relates generally to the field of data communications, and more particularly, to the field of serial communications bus controllers and microcontroller that incorporate the same.

CAN (Control Area Network) is an industry-standard, two-wire serial communications bus that is widely used in automotive and industrial control applications, as well as in medical devices, avionics, office automation equipment, consumer appliances, and many other products and applications. CAN controllers are currently available either as stand-alone devices adapted to interface with a microcontroller or as circuitry integrated into or modules embedded in a microcontroller chip. Since 1986, CAN users (software programmers) have developed numerous high-level CAN Application Layers (CALs) which extend the capabilities of the CAN while employing the CAN physical layer and the CAN frame format, and adhering to the CAN specification. CALs have heretofore been implemented primarily in software, with very little hardware CAL support. Consequently, CALs have heretofore required a great deal of host CPU intervention, thereby increasing the processing overhead and diminishing the performance of the host CPU.

Thus, there is a need in the art for a CAN hardware implementation of CAL functions normally implemented in software in order to offload these tasks from the host CPU to the CAN hardware, thereby enabling a great savings in host CPU processing resources and a commensurate improvement in host CPU performance. One of the most demanding and CPU resource-intensive CAL functions is message management, which entails the handling, storage, and processing of incoming CAL/CAN messages received over the CAN serial communications bus and/or outgoing CAL/CAN messages transmitted over the CAN serial communications bus. CAL protocols, such as DeviceNet, CANopen, and OSEK, deliver long messages distributed over many CAN frames, which methodology is sometimes referred to as "fragmented" or "segmented" messaging. The process of assembling such fragmented, multi-frame messages has heretofore required a great deal of host CPU intervention. In particular, CAL software running on the host CPU actively monitors and manages the buffering and processing of the message data, in order to facilitate the assembly of the message fragments or segments into complete messages.

Based on the above and foregoing, it can be appreciated that there presently exists a need in the art for a hardware implementation of CAL functions normally implemented in software in order to offload these tasks from the host CPU, thereby enabling a great savings in host CPU processing resources and a commensurate improvement in host CPU performance.

The assignee of the present invention has recently developed a new microcontroller product, designated "XA-C3", that fulfills this need in the art. The XA-C3 is the newest member of the Philips XA (eXtended Architecture) family of high performance 16-bit single-chip microcontroller. It is believed that the XA-C3 is the first chip that features hardware CAL support.

The XA-C3 is a CMOS 16-bit CAL/CAN 2.0B microcontroller that incorporates a number of different inventions, including the present invention. These inventions include novel techniques and hardware for filtering, buffering, handling, and processing CAL/CAN messages, including the automatic assembly of multi-frame fragmented messages with minimal CPU intervention, as well as for managing the storage and retrieval of the message data, and the memory resources utilized therefor.

The present invention relates to a method for writing a three-state semaphore code to a given message buffer to indicate an access status of the given message buffer. The application (software) running on the CPU can then read this three-state semaphore code to determine whether the given message buffer is ready for the CPU to read, whether the given message buffer is presently being accessed by the DMA engine (and therefore is not ready for the CPU to read), or whether the given message buffer is presently being read by the CPU. In this manner, the integrity of the data stored in the given message buffer is ensured, even if the DMA engine accesses the given message buffer while a CPU read is in progress.

SUMMARY OF THE INVENTION

The present invention encompasses a method for use in a CAN device (e.g., a CAN microcontroller) that includes a processor core, for automatically transmitting an acknowledge message. The method includes the steps of receiving a frame of a multi-frame fragmented message, and automatically transmitting an acknowledgment message without requiring any intervention of the processor core, in response to the receiving step. The automatically transmitting step is preferably performed by hardware external to the processor core, e.g., a CAN/CAL module of the CAN device.

In a preferred embodiment, the method includes the steps of setting up a first message object having an object number n as a receive message object, enabling the receive message object, setting up a second message object having an object number n+1 as a transmit message object corresponding to the receive message object, storing the acknowledgment message in a response message buffer associated with the transmit message object, receiving a frame of a multi-frame fragmented message, acceptance filtering the received frame to determine that the received frame matches the enabled receive message object, enabling the transmit message object, and automatically transmitting the acknowledgment message, without requiring any intervention of the processor core.

In a specific implementation, the acknowledgment message includes an acknowledgment byte defined by a governing CAL protocol, e.g., the CANopen protocol, and the method further includes the step of copying a toggle bit included in the received frame into a corresponding bit position of the acknowledgment byte prior to the automatically transmitting step.

The present invention, in another of its aspects, encompasses a CAN device, e.g., a CAN microcontroller, that implements the above-described methods.

BRIEF DESCRIPTION OF THE DRAWINGS

These and various other aspects, features, and advantages of the present invention will be readily understood with reference to the following detailed description of the invention read in conjunction with the accompanying drawings, in which:

FIG. 4 is a table listing all of the Memory Mapped Registers (MMRs) provided by the XA-C3 microcontroller;

DETAILED DESCRIPTION OF THE PREFERRED EMBODIMENT

The present invention is described below in the context of a particular implementation thereof, i.e., in the context of the XA-C3 microcontroller manufactured by Philips Semiconductors. Of course, it should be clearly understood that the present invention is not limited to this particular implementation, as any one or more of the various aspects and features of the present invention disclosed herein can be utilized either individually or any combination thereof, and in any desired application, e.g., in a stand-alone CAN controller device or as part of any other microcontroller or system.

Figure 1:
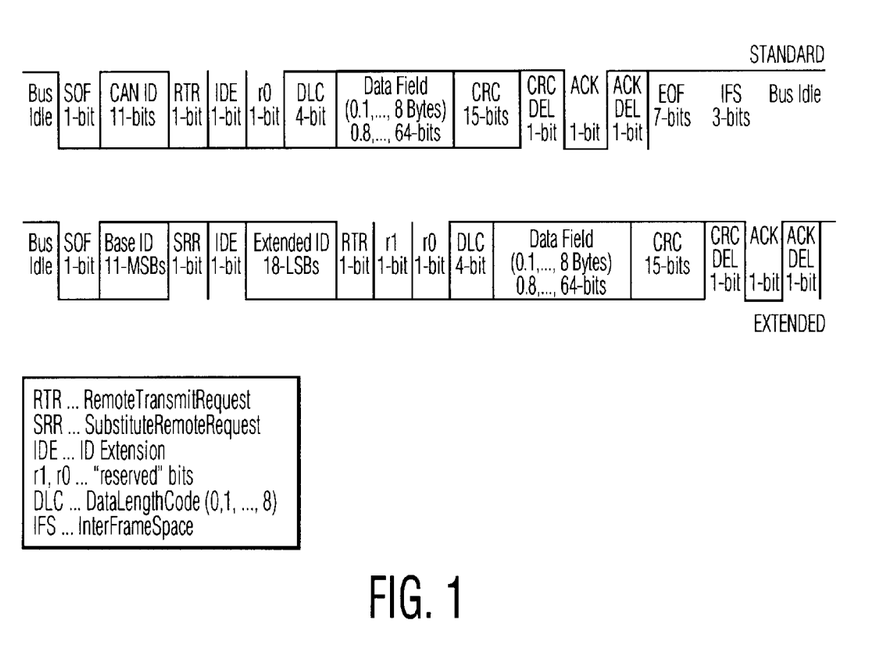
FIG. 1 is a diagram illustrating the format of a Standard CAN Frame and the format of an Extended CAN Frame.
Figure 2:
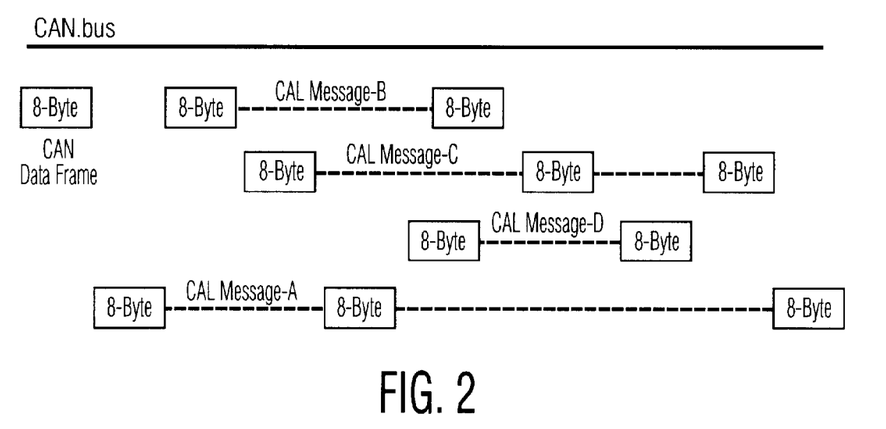
FIG. 2 is a diagram illustrating the interleaving of CAN Data Frames of different, unrelated messages.

The following terms used herein in the context of describing the preferred embodiment of the present invention (i.e., the XA-C3 microcontroller) are defined as follows:

| | |
|---|---|
| Standard CAN Frame: | The format of a Standard CAN Frame is depicted in FIG. 1. |
| Extended CAN Frame: | The format of an Extended CAN Frame is also depicted in FIG. 1. |
| Acceptance Filtering: | The process a CAN device implements in order to determine if a CAN frame should be accepted or ignored and, if accepted, to store that frame in a pre-assigned Message Object. |
| Message Object: | A Receive RAM buffer of pre-specified size (up to 256 bytes for CAL messages) and associated with a particular Acceptance Filter or, a Transmit RAM buffer which the User preloads with all necessary data to transmit a complete CAN Data Frame. A Message Object can be considered to be a communication channel over which a complete message, or a succession of messages, can be transmitted. |
| CAN Arbitration ID: | An 11-bit (Standard CAN 2.0 Frame) or 29-bit extended CAN 2.0B Frame) identifier field placed in the CAN Frame Header. This ID field is used to arbitrate Frame access to the CAN bus. Also used in Acceptance Filtering for CAN Frame reception and Transmit Pre-Arbitration. |
| Screener ID: | A 30-bit field extracted from the incoming message which is then used in Acceptance Filtering. The Screener ID includes the CAN Arbitration ID and the IDE bit, and can include up to 2 Data Bytes. These 30 extracted bits are the information qualified by Acceptance Filtering. |
| Match ID: | A 30-bit field pre-specified by the user to which the incoming Screener ID is compared. Individual Match IDs for each of 32 Message Objects are programmed by the user into designated Memory Mapped Registers (MMRs). |
| Mask: | A 29-bit field pre-specified by the user which can override (Mask) a Match ID comparison at any particular bit (or, combination of bits) in an Acceptance Filter. Individual Masks, one for each Message Object, are programmed by the user in designated MMRs. Individual Mask patterns assure that single Receive Objects can Screen for multiple acknowledged CAL/CAN Frames and thus minimize the number of Receive Objects that must be dedicated to such lower priority Frames. This ability to Mask individual Message Objects is an important new CAL feature. |
| CAL: | CAN Application Layer. A generic term for any high-level protocol which extends the capabilities of CAN while employing the CAN physical layer and the CAN frame format, and which adheres to the CAN specification. Among other things, CALs permit transmission of Messages which exceed the 8 byte data limit inherent to CAN Frames. This is accomplished by dividing each message into multiple packets, with each packet being transmitted as a single CAN Frame consisting of a maximum of 8 data bytes. Such messages are commonly referred to as "segmented" or "fragmented" messages. The individual CAN Frames constituting a complete fragmented message are not typically transmitted in a contiguous fashion, but rather, the individual CAN Frames of different, unrelated messages are interleaved on the CAN bus, as is illustrated in FIG. 2. |
| Fragmented Message: | A lengthy message (in excess of 8 bytes) divided into data packets and transmitted using a sequence of individual CAN Frames. The specific ways that sequences of CAN Frames construct these lengthy messages is defined within the context of a specific CAL. The XA-C3 microcontroller automatically re-assembles these packets into the original, lengthy message in hardware and reports (via an interrupt) when the completed (re-assembled) message is available as an associated Receive Message Object. |
| Message Buffer: | A block of locations in XA Data memory where incoming (received) messages are stored or where outgoing (transmit) messages are staged. |
| MMR: | Memory Mapped Register. An on-chip command/control/status register whose address is mapped into XA Data memory space and is accessed as Data memory by the XA processor. With the XA-C3 microcontroller, a set of eight dedicated MMRs are associated with each Message Object. Additionally, there are several MMRs whose bits control global parameters that apply to all Message Objects. |

Figure 3:
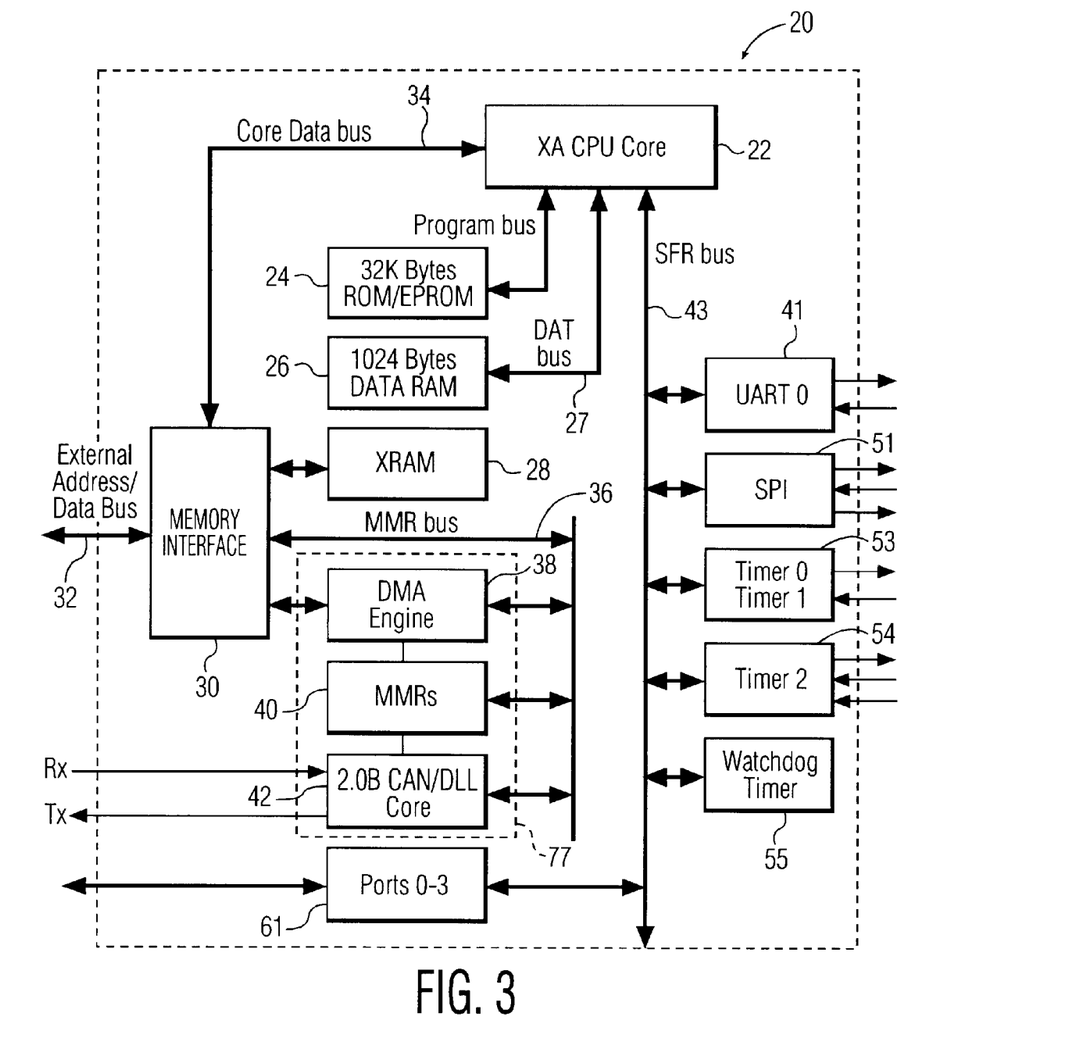
FIG. 3 is a high-level, functional block diagram of the XA-C3 microcontroller.

With reference now to FIG. 3, there can be seen a high-level block diagram of the XA-C3 microcontroller 20. The XA-C3 microcontroller 20 includes the following functional blocks that are fabricated on a single integrated circuit (IC) chip packaged in a 44-pin PLCC or a 44-pin LQFP package:

an XA CPU Core 22, that is currently implemented as a 16-bit fully static CPU with 24-bit program and data address range, that is upwardly compatible with the 80C51 architecture, and that has an operating frequency of up to 30 MHz;

a program or code memory 24 that is currently implemented as a 32K ROM/EPROM, and that is bi-directionally coupled to the XA CPU Core 22 via an internal Program bus 25. A map of the code memory space is depicted in FIG. 4;

a Data RAM 26 (internal or scratch pad data memory) that is currently implemented as a 1024 Byte portion of the overall XA-C3 data memory space, and that is bi-directionally coupled to the XA CPU Core 22 via an internal DATA bus 27;

an on-chip message buffer RAM or XRAM 28 that is currently implemented as a 512 Byte portion of the overall XA-C3 data memory space which may contain part or all of the CAN/CAL (Transmit & Receive Object) message buffers;

a Memory Interface (MIF) unit 30 that provides interfaces to generic memory devices such as SRAM, DRAM, flash, ROM, and EPROM memory devices via an external address/data bus 32, via an internal Core Data bus 34, and via an internal MMR bus 36;

a DMA engine 38 that provides 32 CAL DMA Channels;

a plurality of on-chip Memory Mapped Registers (MMRS) 40 that are mapped to the overall XA-C3 data memory space—a 4K Byte portion of the overall XA-C3 data memory space is reserved for MMRs. These MMRs include 32 (Message) Object or Address Pointers and 32 ID Screeners or Match IDs, corresponding to the 32 CAL Message Objects. A complete listing of all MMRs is provided in the Table depicted in FIG. 5;

a 2.0B CAN/DLL Core 42 that is the CAN Controller Core from the Philips SJA1000 <u>C</u>AN (2.0A/B) <u>D</u>ata <u>L</u>ink <u>L</u>ayer (CDLL) device (hereinafter referred to as the "<u>C</u>AN <u>C</u>ore <u>B</u>lock" (CCB)); and, an array of standard microcontroller peripherals that are bi-directionally coupled to the XA CPU Core 22 via a <u>S</u>pecial <u>F</u>unction <u>R</u>egister (SFR) bus 43. These standard microcontroller peripherals include <u>U</u>niversal <u>A</u>synchronous <u>R</u>eceiver <u>T</u>ransmitter (UART) 49, an SPI serial interface (port) 51, three standard timers/counters with toggle output capability, namely, Timer 0 & Timer 1 included in Timer block 53, and Timer 2 included in Timer block 54, a Watchdog Timer 55, and four 8-bit I/O ports, namely, Ports 0–3 included in block 61, each of which has 4 programmable output configurations.

The DMA engine 38, the MMRs 40, and the CCB 42 can collectively be considered to constitute a CAN/CAL module 77, and will be referred to as such at various times throughout the following description. Further, the particular logic elements within the CAN/CAL module 77 that perform "message management" and "message handling" functions will sometimes be referred to as the "message management engine" and the "message handler", respectively, at various times throughout the following description. Other nomenclature will be defined as it introduced throughout the following description.

As previously mentioned, the XA-C3 microcontroller 20 automatically implements, in hardware, many message management and other functions that were previously only implemented in software running on the host CPU (or not implemented at all), including transparent, automatic re-assembly of up to 32 concurrent, interleaved, multi-frame, fragmented CAL messages. For each application that is installed to run on the host CPU (i.e., the XA CPU Core 22), the user (software programmer) must set-up the hardware for performing these functions by programming certain ones of the MMRs and SFRs in the manner set forth in the XA-C3 Functional Specification and XA-C3 CAN Transport Layer Controller User Manual. The register programming procedures that are most relevant to an understanding of the present invention are described below, followed by a description of the various message management and other functions that are automatically performed by the CAL/CAN module 77 during operation of the XA-C3 microcontroller 20 after it has been properly set-up by the user. Following these sections, a more detailed description of the particular invention to which this application is directed is provided.

Set-up/Programming Procedures

Figure 5:
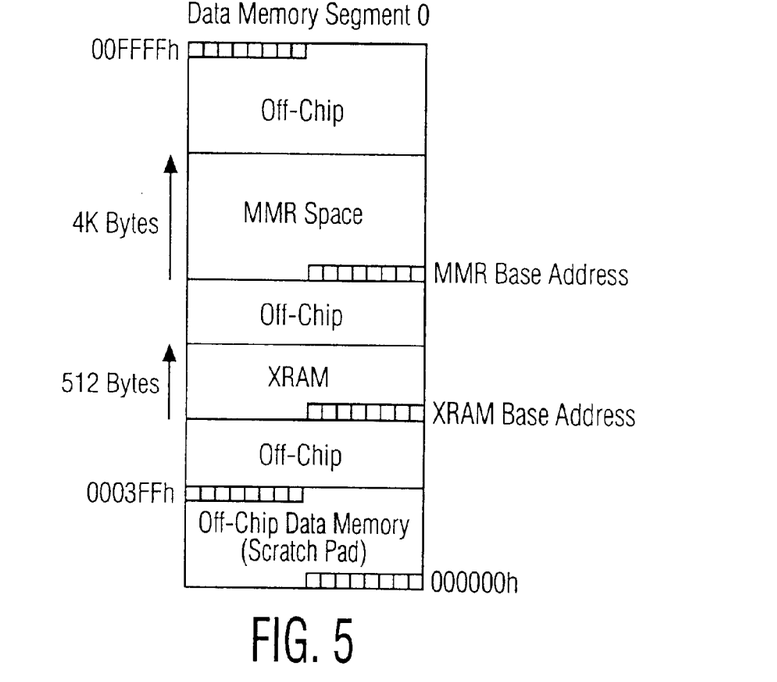
FIG. 5 is a diagram illustrating the mapping of the overall data memory space of the XA-C3 microcontroller.

As an initial matter, the user must map the overall XA-C3 data memory space, as illustrated in FIG. 5. In particular, subject to certain constraints, the user must specify the starting or base address of the XRAM 28 and the starting or base address of the MMRs 40. The base address of the MMRs 40 can be specified by appropriately programming <u>S</u>pecial <u>F</u>unction <u>R</u>egisters (SFRs) MRBL and MRBH. The base address of the XRAM 28 can be specified by appropriately programming the MMRs designated MBXSR and XRAMB (see FIG. 4).

Figure 6:
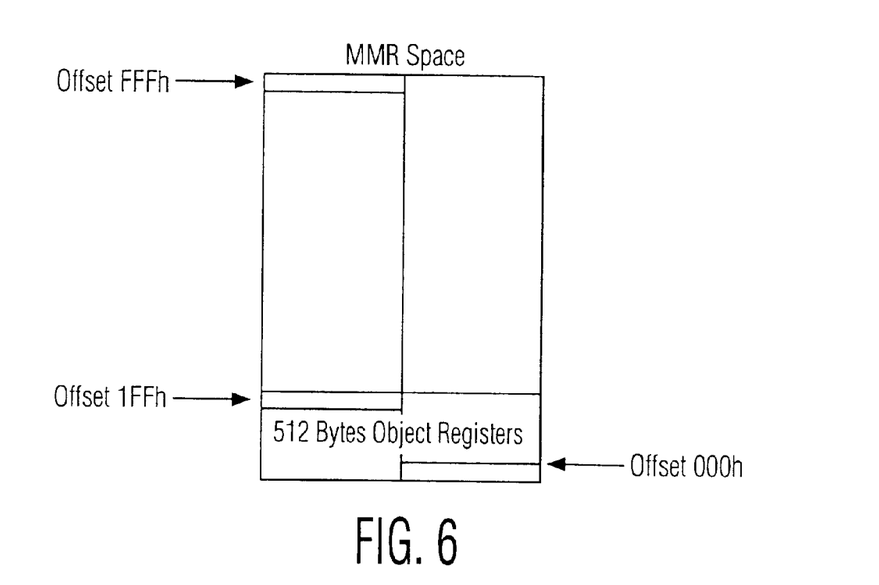
FIG. 6 is a diagram illustrating the MMR space contained within the overall data memory space of the XA-C3 microcontroller.

The user can place the 4 KByte space reserved for MMRs 40 anywhere within the entire 16 Mbyte data memory space supported by the XA architecture, other than at the very bottom of the memory space (i.e., the first 1 KByte portion, starting address of 000000h), where it would conflict with the on-chip Data RAM 26 that serves as the internal or scratch-pad memory. The 4 KBytes of MMR space will always start at a 4 K boundary. The reset values for MRBH and MRBL are 0Fh and F0h, respectively. Therefore, after a reset, the MMR space is mapped to the uppermost 4 KBytes of Data Segment 0Fh, but access to the MMRs 40 is disabled. The first 512 Bytes (offset 000h–1FFh) of MMR space are the Message Object Registers (eight per Message Object) for objects n=0–31, as is shown in FIG. 6.

Figure 7:
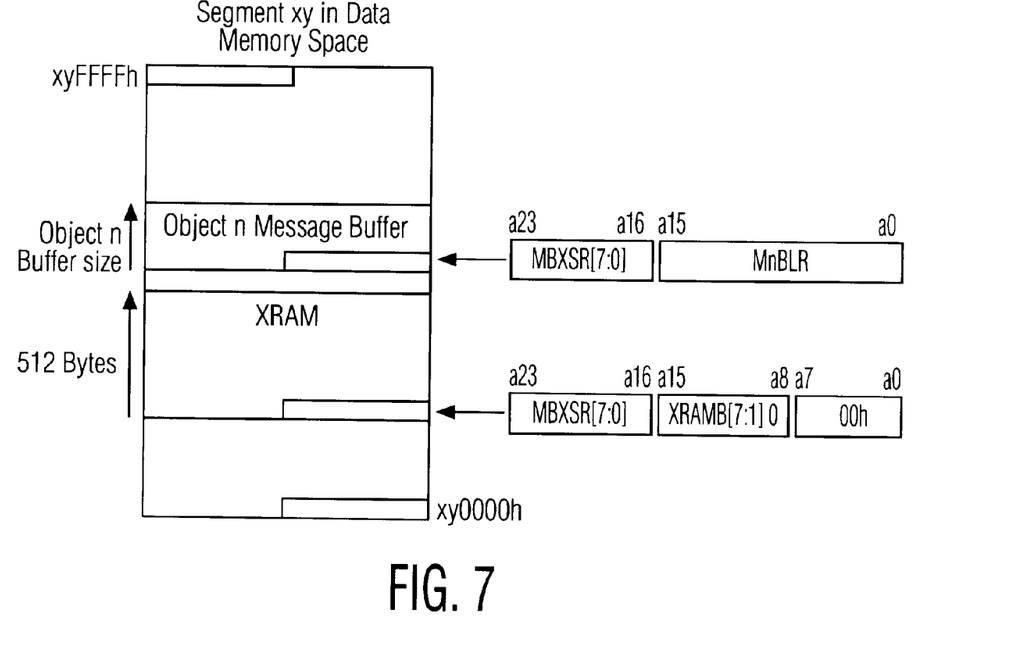
FIG. 7 is a diagram illustrating formation of the base address of the on-chip XRAM of the XA-C3 microcontroller, with an object n message buffer mapped into off-chip data memory.
Figure 8:
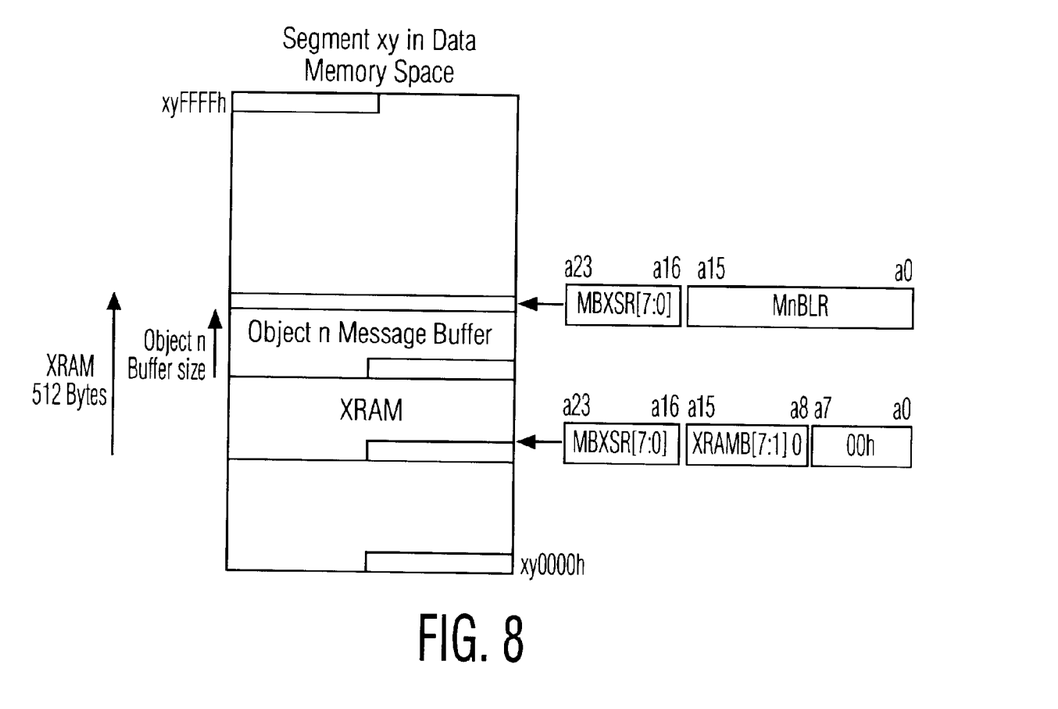
FIG. 8 is a diagram illustrating formation of the base address of the on-chip XRAM of the XA-C3 microcontroller, with an object n message buffer mapped into the on-chip XRAM.

The base address of the XRAM 28 is determined by the contents of the MMRs designated MBXSR and XRAMB, as is shown in FIGS. 7 and 8. As previously mentioned, the 512 Byte XRAM 28 is where some (or all) of the 32 (Rx/Tx) message buffers (corresponding to Message Objects n=0–31) reside. The message buffers can be extended off-chip to a maximum of 8 KBytes. This off-chip expansion capability can accommodate up to thirty-two, 256-Byte message buffers. Since the uppermost 8 bits of all message buffer addresses are formed by the contents of the MBXSR register, the XRAM 28 and all 32 message buffers must reside in the same 64 K Byte data memory segment. Since the XA-C3 microcontroller 20 only provides address lines A0–A19 for accessing external memory, all external memory addresses must be within the lowest 1 MByte of address space. Therefore, if there is external memory in the system into which any of the 32 message buffers will be mapped, then all 32 message buffers and the XRAM 28 must also be mapped entirely into that same 64 KByte segment, which must be below the 1 MByte address limit.

After the memory space has been mapped, the user can set-up or define up to 32 separate Message Objects, each of which can be either a Transmit (Tx) or a Receive (Rx) Message Object. A Rx Message Object can be associated either with a unique CAN ID, or with a set of CAN IDs which share certain ID bit fields. As previously mentioned, each Message Object has its own reserved block of data memory space (up to 256 Bytes), which is referred to as that Message Object's message buffer. As will be seen, both the size and the base address of each Message Object's message buffer is programmable.

As previously mentioned, each Message Object is associated with a set of eight MMRs 40 dedicated to that Message Object. Some of these registers function differently for Tx Message Objects than they do for Rx Message Objects. These eight MMRs 40 are designated "Message Object Registers" (see FIG. 4).

The names of these eight MMRs 40 are:

| 1. | MnMIDH | Message n Match ID High |
|----|--------|-------------------------|
| 2. | MnMIDL | Message n Match ID Low |
| 3. | MnMSKH | Message n Mask High |
| 4. | MnMSKL | Message n Mask Low |
| 5. | MnCTL | Message n Control |
| 6. | MnBLR | Message n Buffer Location Register |
| 7. | MnBSZ | Message n Buffer Size |
| 8. | MnFCR | Message n Fragment Count Register | where n ranges from 0 to 31 (i.e., corresponding to 32 independent Message Objects).

In general, the user defines or sets up a Message Object by configuring (programming) some or all of the eight MMRs dedicated to that Message Object, as will be described below. Additionally, as will be described below, the user must configure (program) the global GCTL register, whose bits control global parameters that apply to all Message Objects.

In particular, the user can specify the Match ID value for each Message Object to be compared against the Screener IDs extracted from incoming CAN Frames for Acceptance Filtering. The Match ID value for each Message Object n is specified in the MnMIDH and MnMIDL registers associated with that Message Object n. The user can mask any Screener ID bits which are not intended to be used in Acceptance Filtering, on an object-by-object basis, by writing a logic '1' in the desired (to-be-masked) bit position(s) in the appropriate MnMSKH and/or MnMSKL registers associated with each particular Message Object n. The user is responsible, on set-up, for assigning a unique message buffer location for each Message Object n. In particular, the user can specify the least significant 16 bits of the base address of the message buffer for each particular Message Object n by programming the MnBLR register associated with that Message Object n. The upper 8 bits of the 24-bit address, for all Message Objects, are specified by the contents of the MBXSR register, as previously discussed, so that the message buffers for all Message Objects reside within the same 64 KByte memory segment. The user is also responsible, on set-up, for specifying the size of the message buffer for each Message Object n. In particular, the user can specify the size of the message buffer for each particular Message Object n by programming the MnBSZ register associated with that Message Object n. The top location of the message buffer for each Message Object n is determined by the size of that message buffer as specified in the corresponding MnBSZ register.

The user can configure (program) the MnCTL register associated with each particular Message Object n in order to enable or disable that Message Object n, in order to define or designate that Message Object n as a Tx or Rx Message Object; in order to enable or disable automatic hardware assembly of fragmented Rx messages (i.e., automatic fragmented message handling) for that Message Object n; in order to enable or disable automatic generation of a Message-Complete Interrupt for that Message Object n; and, in order to enable or not enable that Message Object n for Remote Transmit Request (RTR) handling. In CANopen and OSEK systems, the user must also initialize the MnFCR register associated with each Message Object n.

As previously mentioned, on set-up, the user must configure (program) the global GCTL register, whose bits control global parameters that apply to all Message Objects. In particular, the user can configure (program) the GCTL register in order to specify the high-level CAL protocol (if any) being used (e.g., DeviceNet, CANopen, or OSEK); in order to enable or disable automatic acknowledgment of CANopen Frames (CANopen auto-acknowledge); and, in order to specify which of two transmit (Tx) pre-arbitration schemes/policies is to be utilized (i.e., either Tx pre-arbitration based on CAN ID, with the object number being used as a secondary tiebreaker, or Tx pre-arbitration based on object number only).

Receive Message Objects and the Receive Process

During reception (i.e., when an incoming CAN Frame is being received by the XA-C3 microcontroller 20), the CAN/CAL module 77 will store the incoming CAN Frame in a temporary (13-Byte) buffer, and determine whether a complete, error-free CAN frame has been successfully received. If it is determined that a complete, error-free CAN Frame has been successfully received, then the CAN/CAL module 77 will initiate Acceptance Filtering in order to determine whether to accept and store that CAN Frame, or to ignore/discard that CAN Frame.

Acceptance Filtering

In general, because the XA-C3 microcontroller 20 provides the user with the ability to program separate Match ID and Mask fields for each of the 32 independent Message Objects, on an object-by-object basis, as described previously, the Acceptance Filtering process performed by the XA-C3 microcontroller 20 can be characterized as a "match and mask" technique. The basic objective of this Acceptance Filtering process is to determine whether a Screener ID field of the received CAN Frame (excluding the "don't care" bits masked by the Mask field for each Message Object) matches the Match ID of any enabled one of the 32 Message Objects that has been designated a Receive Message Object. If there is a match between the received CAN Frame and more than one Message Object, then the received CAN Frame will be deemed to have matched the Message Object with the lowest object number (n).

Figure 9:
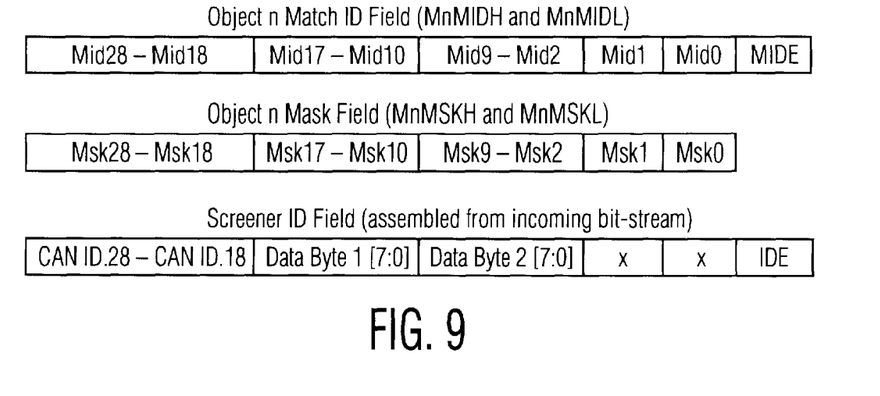
FIG. 9 is a diagram illustrating the Screener ID Field for a Standard CAN Frame, and corresponding Match ID and Mask Fields.
Figure 10:
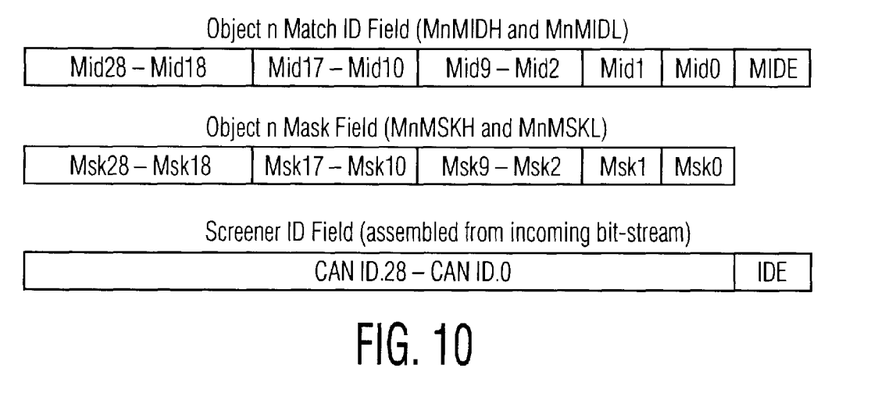
FIG. 10 is a diagram illustrating the Screener ID Field for an Extended CAN Frame, and corresponding Match ID and Mask Fields.

Acceptance Filtering is performed as follows by the XA-C3 microcontroller 20:

(1) A Screener ID field is extracted from the incoming (received) CAN Frame. In this regard, the Screener ID field that is assembled from the incoming bit stream is different for Standard and Extended CAN Frames. In particular, as is illustrated in FIG. 9, the Screener ID field for a Standard CAN Frame is 28 bits, consisting of 11 CAN ID bits extracted from the header of the received CAN Frame+2×8 (16) bits from the first and second data bytes (Data Byte 1 and Data Byte 2) of the received CAN Frame+the IDE bit. Thus, the user is required to set the Msk1 and Msk0 bits in the Mask Field (MnMSKL register) for Standard CAN Frame Message Objects, i.e., to "don't care". In addition, in many applications based on Standard CAN Frames, either Data Byte 1, Data Byte 2, or both do not participate in Acceptance Filtering. In those applications, the user must also mask out the unused Data Byte(s). The IDE bit is not maskable. As is illustrated in FIG. 10, the Screener ID field for an Extended CAN Frame is 30 bits, consisting of 29 CAN ID bits extracted from the header of the incoming CAN Frame+the IDE bit. Again, the IDE bit is not maskable.

(2) The assembled Screener ID field of the received CAN Frame is then sequentially compared to the corresponding Match ID values specified in the MNMIDH and MnMIDL registers for all currently enabled Receive Message Objects. Of course, any bits in the Screener ID field that are masked by a particular Message Object are not included in the comparison. That is, if there is a '1' in a bit position of the Mask field specified in the MnMSKH and Mn MSKL registers for a particular Message Object, then the corresponding bit position in the Match ID field for that particular Message Object becomes a "don't care", i.e., always yields a match with the corresponding bit of the Screener ID of the received CAN Frame.

(3) If the above comparison process yields a match with more than one Message Object, then the received CAN Frame will be deemed to have matched the Message Object having the lowest object number (n).

Message Storage

Each incoming (received) CAN Frame that passes Acceptance Filtering, will be automatically stored, via the DMA engine 38, into the message buffer for the Receive Message Object that particular CAN Frame was found to have matched. In an exemplary implementation, the message buffers for all Message Objects are contained in the XRAM 28.

Message Assembly

In general, the DMA engine 38 will transfer each accepted CAN Frame from the 13-byte pre-buffer to the appropriate message buffer (e.g., in the XRAM 28), one word at a time, starting from the address pointed to by the contents of the MBXSR and MnBLR registers. Every time the DMA engine 38 transfers a byte or a word, it has to request the bus. In this regard, the MIF unit 30 arbitrates between accesses from the XA CPU Core 22 and from the DMA engine 38. In general, bus arbitration is done on an "alternate" policy. After a DMA bus access, the XA CPU Core 22 will be granted bus access, if requested. After an XA CPU bus access, the DMA engine 38 will be granted bus access, if requested. (However, a burst access by the XA CPU Core 22 cannot be interrupted by a DMA bus access).

Once bus access is granted by the MIF unit 30, the DMA engine 38 will write data from the 13-byte pre-buffer to the appropriate message buffer location. The DMA engine 38 will keep requesting the bus, writing message data sequentially to the appropriate message buffer location until the whole accepted CAN Frame is transferred. After the DMA engine 38 has successfully transferred an accepted CAN Frame to the appropriate message buffer location, the contents of the message buffer will depend upon whether the message that the CAN Frame belongs to is a non-fragmented (single frame) message or a fragmented message. Each case is described below:

Non-Fragmented Message Assembly

For Message Objects that have been set up with automatic fragmented message handling disabled (not enabled—i.e., the FRAG bit in the MnCTL register for that Message Object is set to '0'), the complete CAN ID of the accepted CAN Frame (which is either 11 or 29 bits, depending on whether the accepted CAN Frame is a Standard or Extended CAN Frame) is written into the MnMIDH and MNMIDL registers associated with the Message Object that has been deemed to constitute a match, once the DMA engine 38 has successfully transferred the accepted CAN Frame to the message buffer associated with that Message Object. This will permit the user application to see the exact CAN ID which resulted in the match, even if a portion of the CAN ID was masked for Acceptance Filtering. As a result of this mechanism, the contents of the MnMIDH and MnMIDL registers can change every time an incoming CAN Frame is accepted. Since the incoming CAN Frame must pass through the Acceptance Filter before it can be accepted, only the bits that are masked out will change. Therefore, the criteria for match and mask Acceptance Filtering will not change as a result of the contents of the MnMIDH and MnMIDL registers being changed in response to an accepted incoming CAN Frame being transferred to the appropriate message buffer.

Fragmented Message Assembly

For Message Objects that have been set up with automatic fragmented message handling enabled (i.e., with the FRAG bit in the MnCTL register for that Message Object set to '1'), masking of the 11/29 bit CAN ID field is disallowed. As such, the CAN ID of the accepted CAN Frame is known unambiguously, and is contained in the MNMIDH and MnMIDL registers associated with the Message Object that has been deemed to constitute a match. Therefore, there is no need to write the CAN ID of the accepted CAN Frame into the MnMIDH and MnMIDL registers associated with the Message Object that has been deemed to constitute a match.

As subsequent CAN Frames of a fragmented message are received, the new data bytes are appended to the end of the previously received and stored data bytes. This process continues until a complete multi-frame message has been received and stored in the appropriate message buffer.

Figure 11:
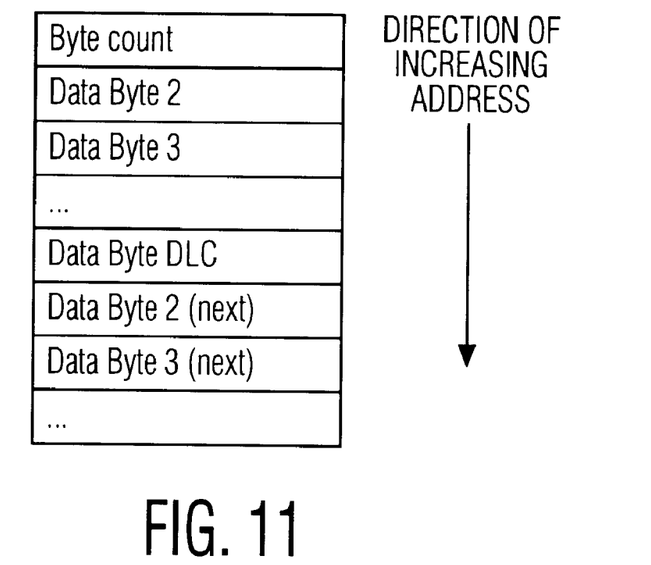
FIG. 11 is a diagram illustrating the message storage format for fragmented CAL messages; and, FIG. 12 is a diagram illustrating the message storage format for fragmented CAN messages.

Under CAL protocols DeviceNet, CANopen, and OSEK, if a Message Object is an enabled Receive Message Object, and its associated MnCTL register has its FRAG bit set to '1' (i.e., automatic fragmented message assembly is enabled for that particular Receive Message Object), then the first data byte (Data Byte 1) of each received CAN Frame that matches that particular Receive Message Object will be used to encode fragmentation information only, and thus, will not be stored in the message buffer for that particular Receive Message Object. Thus, message storage for such "FRAG-enabled" Receive Message Objects will start with the second data byte (Data Byte 2) and proceed in the previously-described manner until a complete multi-frame message has been received and stored in the appropriate message buffer. This message storage format is illustrated in FIG. 11. The message handler hardware will use the fragmentation information contained in Data Byte 1 of each CAN Frame to facilitate this process.

Figure 12:
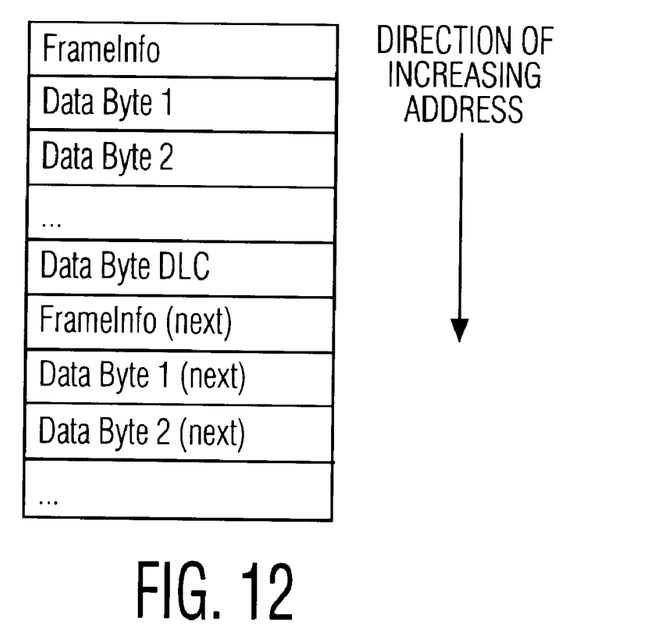

Under the CAN protocol, if a Message Object is an enabled Receive Message Object, and its associated MnCTL register has its FRAG bit set to '1' (i.e., automatic fragmented message assembly is enabled for that particular Receive Message Object), then the CAN Frames that match that particular Receive Message Object will be stored sequentially in the message buffer for that particular Receive Message Object using the format shown in FIG. 12.

When writing message data into a message buffer associated with a Message Object n, the DMA engine 38 will generate addresses automatically starting from the base address of that message buffer (as specified in the MnBLR register associated with that Message Object n). Since the size of that message buffer is specified in the MNBSZ register associated with that Message Object n, the DMA engine 38 can determined when it has reached the top location of that message buffer. If the DMA engine 38 determines that it has reached the top location of that message buffer, and that the message being written into that message buffer has not been completely transferred yet, the DMA engine 38 will wrap around by generating addresses starting from the base address of that message buffer again. Some time before this happens, a warning interrupt will be generated so that the user application can take the necessary action to prevent data loss.

The message handler will keep track of the current address location of the message buffer being written to by the DMA engine 38, and the number of bytes of each CAL message as it is being assembled in the designated message buffer. After an "End of Message" for a CAL message is decoded, the message handler will finish moving the complete CAL message and the Byte Count into the designated message buffer via the DMA engine 38, and then generate an interrupt to the XA CPU Core 22 indicating that a complete message has been received.

Since Data Byte 1 of each CAN Frame contains the fragmentation information, it will never be stored in the designated message buffer for that CAN Frame. Thus, up to seven data bytes of each CAN Frame will be stored. After the entire message has been stored, the designated message buffer will contain all of the actual informational data bytes received (exclusive of fragmentation information bytes) plus the Byte Count at location 00 which will contain the total number of informational data bytes stored.

It is noted that there are several specific user set-up/programming procedures that must be followed when invoking automatic hardware assembly of fragmented OSEK and CANopen messages. These and other particulars can be found in the XA-C3 CAN Transport Layer Controller User Manual that is part of the parent Provisional Application Serial No. 60/154,022, the disclosure of which has been fully incorporated herein for all purposes.

Transmit Message Objects and the Transmit Process

In order to transmit a message, the XA application program must first assemble the complete message and store it in the designated message buffer for the appropriate Transmit Message Object n. The message header (CAN ID and Frame Information) must be written into the MnMIDH, MnMIDL, and MnMSKH registers associated with that Transmit Message Object n. After these steps are completed, the XA application is ready to transmit the message. To initiate a transmission, the object enable bit (OBJ_EN bit) of the MnCTL register associated with that Transmit Message Object n must be set, except when transmitting an Auto-Acknowledge Frame in CANopen. This will allow this ready-to-transmit message to participate in the pre-arbitration process. In this connection, if more than one message is ready to be transmitted (i.e., if more than one Transmit Message Object is enabled), a Tx Pre-Arbitration process will be performed to determine which enabled Transmit Message Object will be selected for transmission. There are two Tx Pre-Arbitration policies which the user can choose between by setting or clearing the Pre_Arb bit in the GCTL register.

After a Tx Message Complete interrupt is generated in response to a determination being made by the message handler that a completed message has been successfully transmitted, the Tx Pre-Arbitration process is "reset", and begins again. Also, if the "winning" Transmit Message Object subsequently loses arbitration on the CAN bus, the Tx Pre-Arbitration process gets reset and begins again. If there is only one Transmit Message Object whose OBJ_EN bit is set, it will be selected regardless of the Tx Pre-Arbitration policy selected.

Once an enabled Transmit Message Object has been selected for transmission, the DMA engine 38 will begin retrieving the transmit message data from the message buffer associated with that Transmit Message Object, and will begin transferring the retrieved transmit message data to the CCB 42 for transmission. The same DMA engine and address pointer logic is used for message retrieval of transmit messages as is used for message storage of receive messages, as described previously. Further, message buffer location and size information is specified in the same way, as described previously. In short, when a transmit message is retrieved, it will be written by the DMA engine 38 to the CCB 42 sequentially. During this process, the DMA engine 38 will keep requesting the bus; when bus access is granted, the DMA engine 38 will sequentially read the transmit message data from the location in the message buffer currently pointed to by the address pointer logic; and, the DMA engine 38 will sequentially write the retrieved transmit message data to the CCB 42. It is noted that when preparing a message for transmission, the user application must not include the CAN ID and Frame Information fields in the transmit message data written into the designated message buffer, since the Transmit (Tx) logic will retrieve this information directly from the appropriate MnMIDH, MnMIDL, and MnMSKH registers.

The XA-C3 microcontroller 20 does not handle the transmission of fragmented messages in hardware. It is the user's responsibility to write each CAN Frame of a fragmented message to the appropriate message buffer, enable the associated Transmit Message Object for transmission, and wait for a completion before writing the next CAN Frame of that fragmented message to the appropriate message buffer. The user application must therefore transmit multiple CAN Frames one at a time until the whole multi-frame, fragmented transmit message is successfully transmitted. However, by using multiple Transmit Message Objects whose object numbers increase sequentially, and whose CAN IDs have been configured identically, several CAN Frames of a fragmented transmit message can be queued up and enabled, and then transmitted in order.

To avoid data corruption when transmitting messages, there are three possible approaches:

1. If the Tx Message Complete interrupt is enabled for the transmit message, the user application would write the next transmit message to the designated transmit message buffer upon receipt of the Tx Message Complete interrupt. Once the interrupt flag is set, it is known for certain that the pending transmit message has already been transmitted.
2. Wait until the OBJ_EN bit of the MnCTL register of the associated Transmit Message Object clears before writing to the associated transmit message buffer. This can be accomplished by polling the OBJ_EN bit of the MnCTL register of the associated Transmit Message Object.
3. Clear the OBJ_EN bit of the MnCTL register of the associated Transmit Message Object while that Transmit Message Object is still in Tx Pre-Arbitration.

In the first two cases above, the pending transmit message will be transmitted completely before the next transmit message gets transmitted. For the third case above, the transmit message will not be transmitted. Instead, a transmit message with new content will enter Tx Pre-Arbitration.

There is an additional mechanism that prevents corruption of a message that is being transmitted. In particular, if a transmission is ongoing for a Transmit Message Object, the user will be prevented from clearing the OBJ_EN bit in the MnCTL register associated with that particular Transmit Message Object.

CAN/CAL RELATED INTERRUPTS

The CAN/CAL module 77 of the XA-C3 microcontroller 20 is presently configured to generate the following five different Event interrupts to the XA CPU Core 22:

1. Rx Message Complete
2. Tx Message Complete
3. Rx Buffer Full
4. Message Error
5. Frame Error For single-frame messages, the "Message Complete" condition occurs at the end of the single frame. For multi-frame (fragmented) messages, the "Message Complete" condition occurs after the last frame is received and stored. Since the XA-C3 microcontroller 20 hardware does not recognize or handle fragmentation for transmit messages, the Tx Message Complete condition will always be generated at the end of each successfully transmitted frame.

As previously mentioned, there is a control bit associated with each Message Object indicating whether a Message Complete condition should generate an interrupt, or just set a "Message Complete Status Flag" (for polling) without generating an interrupt. This is the INT_EN bit in the MnCTL register associated with each Message Object n.

There are two 16-bit MMRs 40, MCPLH and MCPLL, which contain the Message Complete Status Flags for all 32 Message Objects. When a Message Complete (Tx or Rx) condition is detected for a particular Message Object, the corresponding bit in the MCPLH or MCPLL register will be set. This will occur regardless of whether the INT_EN bit is set for that particular Message Object (in its associated MnCTL register), or whether Message Complete Status Flags have already been set for any other Message Objects.

In addition to these 32 Message Complete Status Flags, there is a Tx Message Complete Interrupt Flag and an Rx Message Complete Interrupt Flag, corresponding to bits [1] and [0], respectively, of an MMR 40 designated CANINTFLG, which will generate the actual Event interrupt requests to the XA CPU Core 22. When an End-of-Message condition occurs, at the same moment that the Message Complete Status Flag is set, the appropriate Tx or Rx Message Complete Interrupt flip-flop will be set provided that INT_EN=1 for the associated Message Object, and provided that the interrupt is not already set and pending.

Further details regarding the generation of interrupts and the associated registers can be found in the XA-C3 Functional Specification and in the XA-C3 CAN Transport Layer Controller User Manual, both of which are part of the parent Provisional Application Serial No. 60/154,022, the disclosure of which has been fully incorporated herein for all purposes.

THE PRESENT INVENTION

Some CAL protocols, most notably the CANopen protocol, require an acknowledgment message to be transmitted by a receiving CAN device in response to each CANopen Frame received by the receiving CAN device, even though the CANopen protocol supports multi-frame, fragmented messages. Interrupting the XA-C3 CPU Core 22 (hereinafter referred to sometimes as simply the "processor core") following reception of each CANopen Frame of a fragmented, multi-frame CANopen message, in order to permit it to transmit the required acknowledgment, would seriously undermine the major advantages that inure from the automatic hardware assembly of multi-frame, fragmented messages provided by the XA-C3 microcontroller 20. Thus, in accordance with the present invention, the XA-C3 microcontroller 20 permits the hardware to automatically issue the required acknowledgments under the CANopen protocol, without interrupting the processor core 22 and with no significant increase in die cost. It should be noted that this so-called "automatic (or "auto-") acknowledgment" feature is only advantageous for fragmented messages, and high-level CAL protocols, such as CANopen, that require such acknowledgments to be issued. Messages which are completely contained within a single CAN Frame will generate End-of-Message interrupts to the processor core 22 anyway, so there would be no added value or benefit in having the hardware automatically issue an acknowledgment.

In overview, the basic scheme for effectuating the auto-acknowledgment feature involves having the software (i.e., the application running on the processor core 22) set up a dedicated "Response" Message Object corresponding to each Receive Message Object requiring acknowledgment. Each such Response Message Object must be designated as a Transmit Message Object, and must be assigned an object number immediately following the object number of the associated Receive Message Object. For example, if Message Object n=13 is a Receive Message Object for a fragmented message which requires acknowledgments to be issued, then Message Object n=14 would be set up by the software as a Transmit Message Object containing the requisite response code for Message Object n=13.

More particularly, the auto-acknowledgment feature is implemented in the following manner in the XA-C3 microcontroller 20. Assuming that the CAL protocol specified in the Global Control (GCTL) Register is CANopen (by virtue of the [Prtcl1 and Prtc10] bits being set to 00), then the auto-acknowledgment feature can be enabled by virtue of the user (application) setting the Auto_Ack bit in the GCTL Register to '1'.

Assume that an enabled Receive Message Object n has been set up with automatic hardware assembly of fragmented messages enabled (i.e., with the FRAG bit in the MnCTL Register associated with that Receive Message Object n set to '1'). The Message Object n+1 is set up with the OBJ_EN bit in the Mn+1CTL Register associated with that Message Object n+1 not set to '1', i.e., with the OBJ_EN bit cleared to '0'=disabled. The user (software) must store the proper "Acknowledgment Byte", as defined by the CALopen protocol specification, in byte offset 0 of the message buffer associated with the Message Object n+1. Bit position [4] is a "don't care", because the CAN/CAL module 77 will automatically insert the toggle bit value from the incoming CANopen Frame into the toggle bit position [4] of the outgoing auto-acknowledge Frame, as will be described below.

Assume that the auto-acknowledge feature has been enabled, and assume that an incoming CANopen Frame is successfully received, passes through the Acceptance Filtering process, and is deemed to match the enabled Receive Message Object n. With the above set-up, the following steps are automatically implemented, in hardware, by the CAN/CAL module 77.

More particularly, the CAN/CAL module 77 will automatically set the OBJ_EN and Tx bits in the Mn+1CTL Register associated with the matching Message Object n+1 to '1', thereby enabling that Message Object as a Transmit Message Object. This will activate that Transmit Message Object n+1, and cause it to be included in the Transmit Pre-Arbitration process, as previously described. The acknowledgment Frame stored in the message buffer associated with that Transmit Message Object n+1 will be automatically retrieved and transmitted as soon as its priority permits. As previously mentioned, the CANopen protocol specifies that the state of a control bit, termed the "toggle bit", contained in the identifier field of the incoming CANopen Frame, must be reflected in the acknowledgment Frame. In this connection, the CAN/CAL module 77 of the XA-C3 microcontroller 22 includes logic that automatically copies the toggle bit of the incoming CANopen Frame into the corresponding bit position [4] of the acknowledgment Frame stored in the message buffer associated with the Transmit Message Object n+1 before it is enabled for transmit (Tx).

Although the present invention has been described in detail hereinabove in the context of a specific preferred embodiment/implementation, it should be clearly understood that many variations, modifications, and/or alternative embodiments/implementations of the basic inventive concepts taught herein which may appear to those skilled in the pertinent art will still fall within the spirit and scope of the present invention, as defined in the appended claims.

What is claimed is:

1. In a CAN device that includes a processor core, a method for automatically transmitting an acknowledgment message, the method including the steps of:
   receiving a frame of a multi-frame fragmented message in a temporary buffer; and
   automatically transmitting an acknowledgment message created by a CAN/CAL hardware module external to the processor core, said CAN/CAL (Control Area Network/CAN Application Layers) hardware module includes said temporary buffer, and said hardware module emulates CAL software functions so that processor core intervention is not required to create the acknowledgment message in CAL software that designates the recipient of the acknowledgment message is the sender of the multi-frame fragmented message, in response to the receiving step.

2. the method as set forth in claim 1, wherein the CAN device is enabled to operate under a CAL protocol that requires transmission of the acknowledgement message.

3. The method as set forth in claim 2, wherein the CAL protocol comprises a CANopen protocol.

4. The method as set forth in claim 1, wherein the acknowledgment message is stored in a response message buffer associated with a designated transmit message object.

5. The method as set forth in claim 4, wherein the acknowledgment message includes an acknowledgment byte defined by a governing CAL protocol.

6. The method as set forth in claim 5, wherein the acknowledgment byte is stored in the response message buffer by an application running on the processor core.

7. The method as set forth in claim 5, wherein the acknowledgment byte is stored in the response message buffer by a user during an object set-up procedure.

8. The method as set forth in claim 5, wherein the governing CAL protocol is a CANopen protocol.

9. The method as set forth in claim 8, further including the step of copying a toggle-bit included in the received frame into a corresponding bit position of the acknowledgment byte.

10. The method as set forth in claim 4, wherein the transmit message object comprises a message object having an object number n+1 that is assigned to a receive message object having an object number n by a user during an object-set-up procedure.

11. The method as set forth in claim 1, further including the steps of:
   setting up a first message object having an object number n as a receive message object;
   enabling the receive message object;
   setting up a second message object having an object number n+1 as a transmit message object corresponding to the receive message object; and
   storing the acknowledgment message in a response message buffer associated with the transmit message object;
   wherein each of the above-recited steps is performed prior to the receiving step.

12. The method as set forth in claim 11, wherein the acknowledgment message includes an acknowledgment byte define by a governing CAL protocol.

13. The method as set forth in claim 12, wherein the governing CAL protocol is a CANopen protocol.

14. The method as set forth in claim 13, further including the step of copying a toggle bit included in the received frame into a corresponding bit position of the acknowledgment byte.

15. The method as set forth in claim 11, further including the steps of:
   acceptance filtering the received frame to determine that the received frame matches the enabled receive message object; and
   enabling the transmit message object;
   wherein the above-recited steps are performed between the receiving and the automatically transmitting steps.

16. In a CAN device that includes a processor core, a method for automatically transmitting an acknowledgment message, the method including the steps of:
   setting up a first message object having an object number n as a receive message object;
   enabling the receive message object;
   setting up a second message object having an object number n+1 as a transmit message object corresponding to the receive message object;
   storing the acknowledgment message in a response message buffer associated with the transmit message object;
   receiving a frame of a multi-frame fragmented message;
   acceptance filtering the received frame to determine that the received frame matches the enabled receive message object; and
   automatically transmitting the acknowledgment message without requiring intervention of the processor core to create the acknowledgment message and identify a recipient of said acknowledgment message by using a CAN/CAL hardware module that is arranged external to the processor core to emulate CAL (Control Area Network Application Layers) software function by said CAN/CAL hardware module.

17. The method as set forth in claim 16, wherein the acknowledgment message includes an acknowledgment byte defined by a governing CAL protocol.

18. The method as set forth in claim 17, wherein the governing CAL protocol is the CANopen protocol.

19. The method as set forth in claim 18, further including the step of copying a toggle bit included in the received frame into a corresponding bit position of the acknowledgment byte prior to the automatically transmitting step.

20. The method as set forth in claim 16, wherein the automatically transmitting step is performed by hardware external to the processor core.

21. The method as set forth in claim 20, wherein the hardware external to the processor core includes a CAN/CAL module.

22. The method as set forth in claim 21, wherein the CAN device comprises a CAN microcontroller.

23. A CAN device that implements the method set forth in claim 1.

24. The CAN device as set forth in claim 23, wherein the CAN device comprises a CAN microcontroller.

25. A CAN device that implements the method set forth in claim 16.

26. The CAN device as set forth in claim 25, wherein the CAN device comprises a CAN microcontroller.

* * * * *